UNITED STATES PATENT OFFICE.

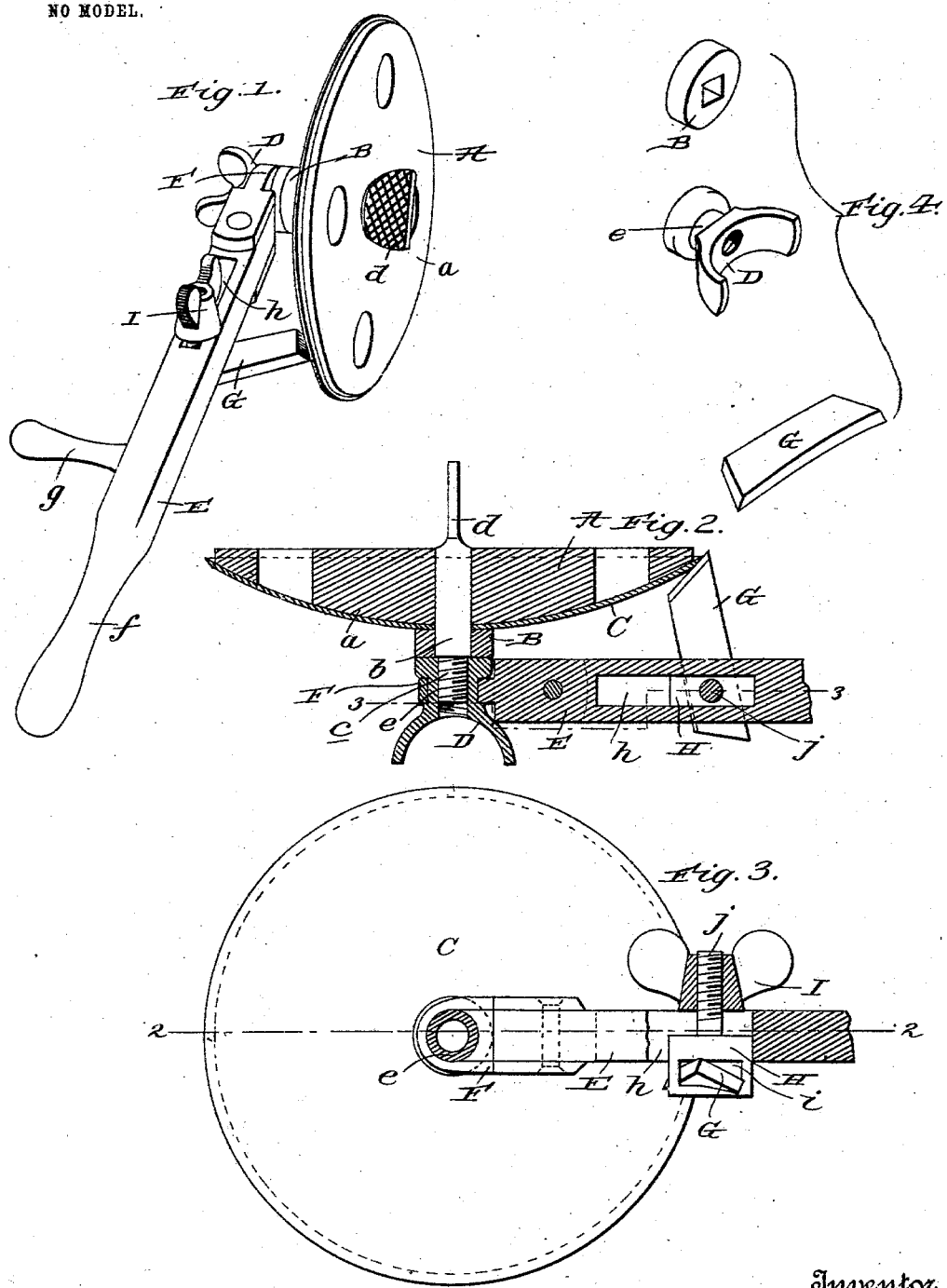

PAUL CAFFAREL, OF MANCHAC, LOUISIANA.

DISK-SHARPENER.

SPECIFICATION forming part of Letters Patent No. 717,657, dated January 6, 1903.

Application filed September 17, 1902. Serial No. 123,707. (No model.)

*To all whom it may concern:*

Be it known that I, PAUL CAFFAREL, a citizen of the United States, residing at Manchac, in the parish of East Baton Rouge and State of Louisiana, have invented new and useful Improvements in Disk-Sharpeners, of which the following is a specification.

My invention relates to improvements in sharpeners for cultivator and other disks, and its novelty, utility, and practical advantages will be fully understood from the following description and claim when taken in connection with the accompanying drawings, in which—

Figure 1 is a perspective view of my improved sharpener with a disk in position to be sharpened thereon; Fig. 2, a detail enlarged section taken diametrically through the disk-plate of the sharpener in the plane indicated by the broken line 2 2 of Fig. 3; Fig. 3, a view taken at right angles to Fig. 2 on the broken line 3 3 of said figure; and Fig. 4 disconnected perspective views of parts of the sharpener.

Similar letters of reference designate corresponding parts in all of the several views of the drawings, referring to which—

A is the disk-plate of my improved sharpener, which is suitably formed of metal and is convex at one side, as indicated by $a$. This disk-plate is provided at its convex side with a central projection $b$, having a reduced and threaded end $c$, and at its opposite or flat side it is provided with a central projection $d$, which is preferably flat and roughened at both sides, as shown, so as to adapt it to be securely held in a vise. The projections $b$ and $d$ are shown as the ends of a piece of metal of angular form in cross-section shrunk or otherwise secured in an aperture of corresponding form in the disk-plate; but I desire it understood that when desired said projections $b$ and $d$ may be formed integral with the disk-plate without involving a departure from the scope of my invention.

B is a washer removably arranged on the projection $b$ of the disk-plate and designed to hold a cultivator-disk C against the convex side of said plate, as shown in Fig. 2; D, a nut removably arranged on the threaded end of the projection $b$ and against the washer B, and having a reduced portion $e$ at an intermediate point of its length; E, a lever having a handle $f$ at its outer end and a lateral handle $g$ adjacent to said end, and also having a longitudinal slot $h$ disposed parallel to the disk-plate; F, a clip on the inner end of the lever, which bears on and straddles the reduced portion $e$ of nut D; G, a sharpening-tool; H, a tool-holder arranged and adapted to move in the slot $h$ of the lever E, both longitudinally and transversely of the lever, and having an opening $i$ to receive the tool, and a threaded stem $j$, and I a nut mounted on said threaded stem and arranged to bear against the lever. When the nut I is loosened, it will be observed that the tool-holder is rendered free to be adjusted lengthwise of the lever to enable the tool to properly engage the edges of disks of various diameters; also, that the tool is rendered free to be adjusted in the tool-holder to take up wear of the tool or for any other purpose.

In using my improved sharpener the parts are assembled as best shown in Fig. 2—*i. e.,* the disk C is placed on the projection $b$ and against the convex side of the disk-plate, the washer B is placed on projection $b$ and against the disk, and the nut D, which bears the lever E and the appurtenances thereof, is screwed on the threaded end of the projection $b$. With this done, the projection $d$ on the disk-plate is secured between the jaws of a vise or the like, after which the operator grasps the handles $f$ and $g$ of lever E with his hands and draws the lever toward him, so as to cause the tool G to sharpen the edge of the disk C.

It will be appreciated from the foregoing that the construction of my improved sharpener is such that a disk may be readily secured therein and as readily released and removed; also, that the sharpening of a disk through the medium of the device requires but a minimum amount of effort.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my invention as claimed.

Having described my invention, what I claim, and desire to secure by Letters Patent, is—

In a disk-sharpener, a disk-plate having a projection at one of its sides, adapted to be held between the jaws of a vise or the like, and also having a threaded projection at its opposite side; in combination with a nut for holding a disk on the threaded projection and against the disk-plate; said nut having a reduced portion e at an intermediate point of its length, a lever connected to and adapted to turn on said portion e of the nut, and a sharpening device adjustably connected to the lever.

In testimony whereof I have hereunto set my hand in presence of two subscribing witnesses.

PAUL CAFFAREL.

Witnesses:
W. S. RONALDSON,
E. M. ELAM.